US012647514B2

(12) United States Patent
Nakamura

(10) Patent No.: US 12,647,514 B2
(45) Date of Patent: Jun. 2, 2026

(54) INFORMATION PROCESSING APPARATUS, INFORMATION PROCESSING SYSTEM, NON-TRANSITORY COMPUTER READABLE MEDIUM STORING INFORMATION PROCESSING PROGRAM, AND INFORMATION PROCESSING METHOD

(71) Applicant: FUJIFILM Business Innovation Corp., Tokyo (JP)

(72) Inventor: Shota Nakamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/873,172

(22) Filed: Jul. 26, 2022

(65) Prior Publication Data

US 2023/0308541 A1 Sep. 28, 2023

(30) Foreign Application Priority Data

Mar. 23, 2022 (JP) ................................. 2022-047442

(51) Int. Cl.
*H04M 3/42* (2006.01)
(52) U.S. Cl.
CPC ... *H04M 3/42093* (2013.01); *H04M 3/42365* (2013.01); *H04M 2242/22* (2013.01)
(58) Field of Classification Search
CPC ......... H04M 3/42093; H04M 3/42365; H04M 2242/22
USPC ........................................................ 455/415
See application file for complete search history.

(56) References Cited

U.S. PATENT DOCUMENTS

| | | | | | |
|---|---|---|---|---|---|
| 7,123,706 | B2 | 10/2006 | Oki | | |
| 2018/0070290 | A1* | 3/2018 | Breaux | .................. | G06F 9/546 |
| 2019/0215373 | A1* | 7/2019 | Mathur | .................. | H04L 67/52 |

FOREIGN PATENT DOCUMENTS

| | | |
|---|---|---|
| JP | H11032144 | 2/1999 |
| JP | 2005018194 | 1/2005 |
| JP | 2005101817 | 4/2005 |
| JP | 2008099043 | 4/2008 |
| JP | 2010015418 | 1/2010 |
| JP | 2016005149 | 1/2016 |

OTHER PUBLICATIONS

"Notice of Reasons for Refusal of Japan Counterpart Application", issued on Dec. 16, 2025, with English translation thereof, p. 1-p. 8.
"Decision of Refusal of Japan Counterpart Application", issued on Mar. 31, 2026, with English translation thereof, pp. 1-8.

* cited by examiner

*Primary Examiner* — Ahmad F. Matar
*Assistant Examiner* — Jirapon Tulop
(74) *Attorney, Agent, or Firm* — JCIPRNET

(57) ABSTRACT

An information processing apparatus includes a processor configured to perform a process including acquiring a detection result of a state of a receiver who receives a call request at a receiver side terminal or a measurement result of a degree of concentration of the receiver measured from the detection result in a case where the call request is accepted from a caller side terminal, and notifying the receiver side terminal of the call request in a case where the degree of concentration measured from the acquired detection result or the degree of concentration that is the measurement result is decreased to a predetermined degree of concentration.

16 Claims, 12 Drawing Sheets

FIG. 3

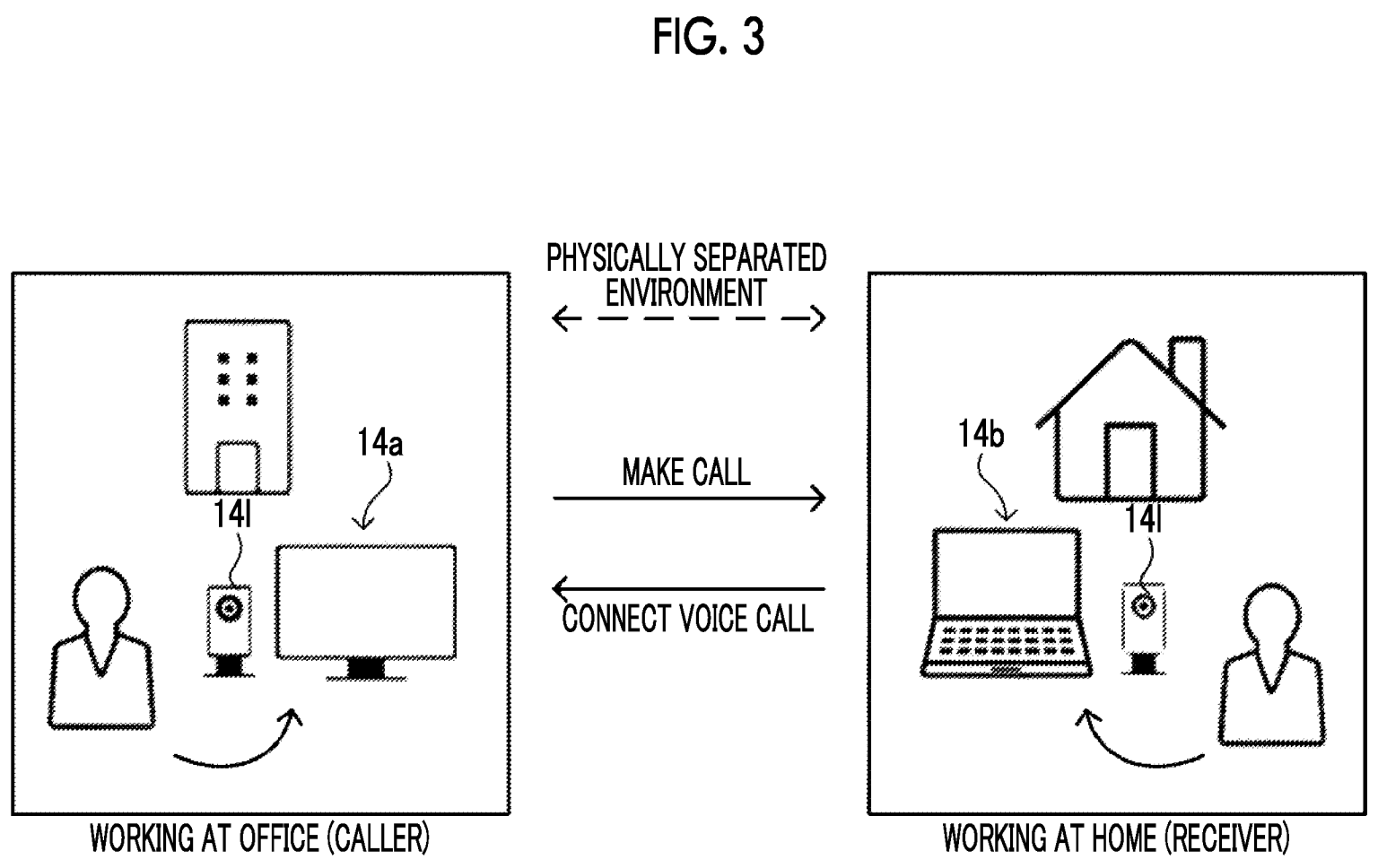

PHYSICALLY SEPARATED ENVIRONMENT

MAKE CALL

CONNECT VOICE CALL

WORKING AT HOME (RECEIVER)

14l

14b

WORKING AT OFFICE (CALLER)

14a

14l

INFORMATION PROCESSING APPARATUS, INFORMATION PROCESSING SYSTEM, NON-TRANSITORY COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application No. 2022-047442 filed Mar. 23, 2022.

BACKGROUND

(i) Technical Field

The present invention relates to an information processing apparatus, an information processing system, a non-transitory computer readable medium storing an information processing program, and an information processing method.

(ii) Related Art

JP2005-018194A proposes a communication exchange system including an exchanger that automatically changes a transfer destination of an incoming call addressed to a user based on the presence of the user.

JP1999-032144A proposes a communication support device that supports communication between one terminal station and another terminal station connected via a network. The communication support device includes a video acquisition unit that obtains, as a video, a situation around one terminal station, a video conversion unit that processes the obtained video into an outline video excluding detailed contents, and a video transmission unit that transmits the outline video to the other terminal station based on the acceptance of a communication request from the other terminal station, and a user of the other terminal station determines whether or not to start communication with the one terminal station by the video.

SUMMARY

In a case where a call is made between physically separated locations, since the receiver is notified of the call request regardless of a state of the receiver who receives the call request, the receiver is notified of the call request, and thus, the work may be disturbed in a case where the receiver is concentrated.

Aspects of non-limiting embodiments of the present disclosure relate to an information processing apparatus, an information processing system, a non-transitory computer readable medium storing an information processing program, and an information processing method that are capable of suppressing the disturbance of a work of a receiver as compared to a case where a receiver who receives a call request is notified of a call request regardless of a state of the receiver.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to perform a process including acquiring a detection result of a state of a receiver who receives a call request at a receiver side terminal or a measurement result of a degree of concentration of the receiver measured from the detection result in a case where the call request is accepted from a caller side terminal, and notifying the receiver side terminal of the call request in a case where the degree of concentration measured from the acquired detection result or the degree of concentration that is the measurement result is decreased to a predetermined degree of concentration.

BRIEF DESCRIPTION OF THE DRAWINGS

Exemplary embodiment(s) of the present invention will be described in detail based on the following figures, wherein:

FIG. 3 is a diagram illustrating a voice call service;

DETAILED DESCRIPTION

Figure 1:
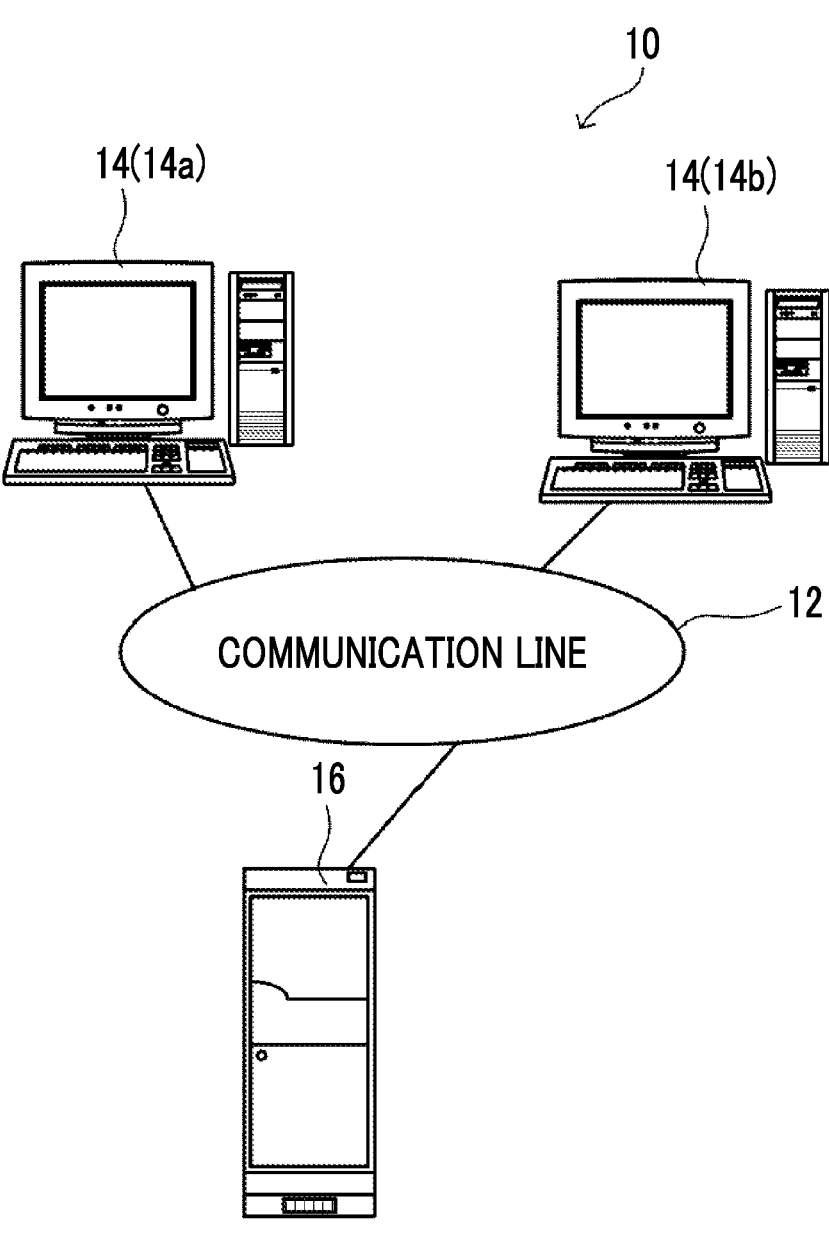
FIG. 1 is a diagram showing a schematic configuration of an information processing system according to the present exemplary embodiment.

Hereinafter, an example of the present exemplary embodiment will be described in detail with reference to the drawings. In the present exemplary embodiment, an information processing system in which a plurality of information processing apparatuses and a server are connected via communication lines such as various networks will be described. FIG. 1 is a diagram showing a schematic configuration of an information processing system 10 according to the present exemplary embodiment.

As shown in FIG. 1, the information processing system 10 according to the present exemplary embodiment includes a plurality of information processing terminals 14a, 14b, . . . , and a server 16. In a case where it is not necessary to distinguish between the information processing terminals 14a, 14b, and the like, the alphabet at the end of a reference numeral may be omitted.

The information processing terminals 14 and the server 16 are connected to via a communication line 12 such as a local area network (LAN), a wide area network (WAN), the Internet, and an intranet. The information processing terminals 14 and the server can mutually transmit and receive various kinds of data via the communication line 12.

In the information processing system 10 according to the present exemplary embodiment, the server 16 provides a voice call service as a cloud service. The voice call service is a service for making a voice call between the information processing terminals 14 provided in physically separated environments.

Figure 2:
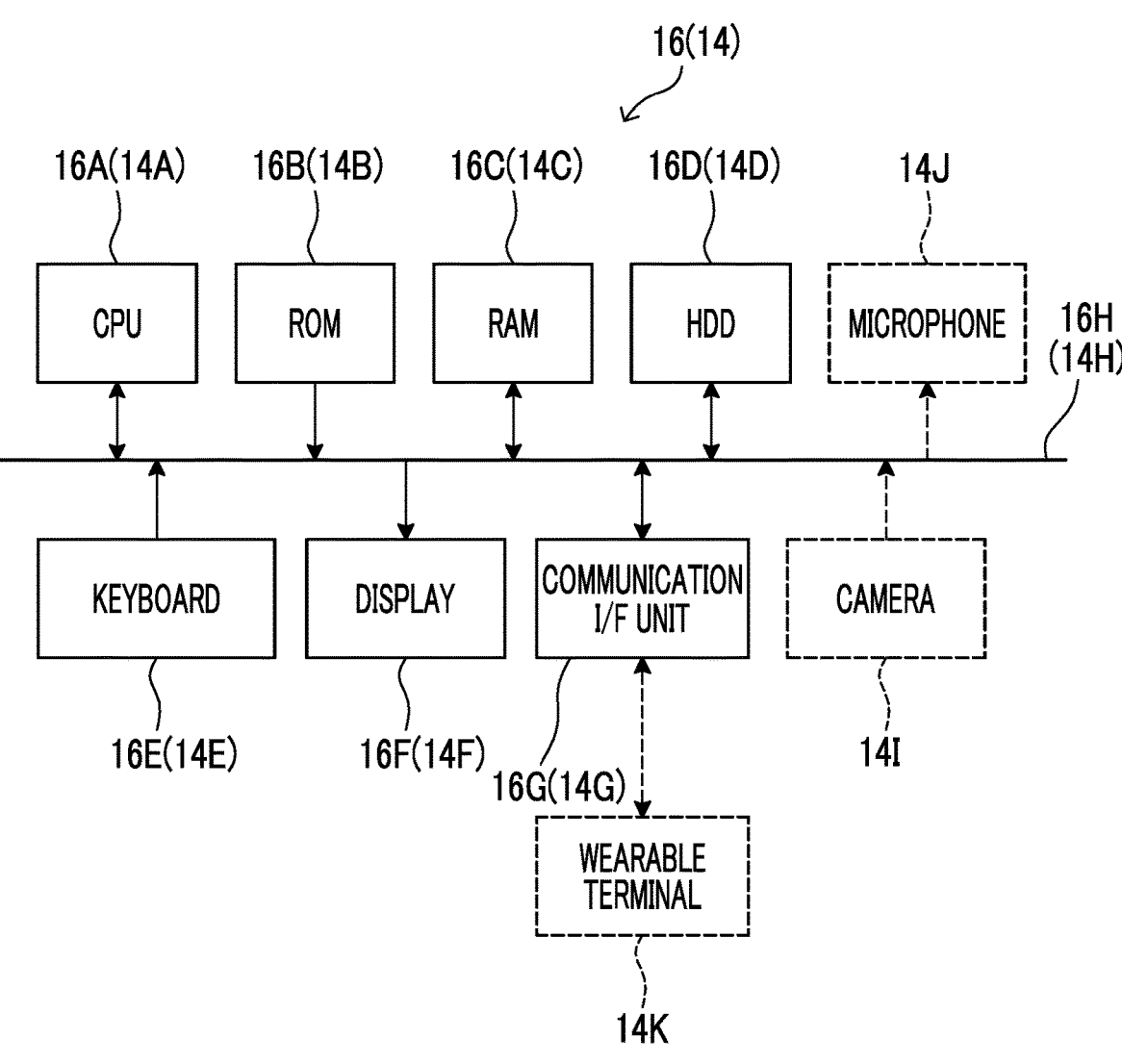
FIG. 2 is a block diagram showing a configuration of a part of an electrical system of an information processing terminal and a server in the information processing system according to the present exemplary embodiment.

Next, a configuration of a part of an electrical system of the information processing terminal 14 and the server 16 according to the present exemplary embodiment will be described. FIG. 2 is a block diagram showing the configuration of the part of the electrical system of the information processing terminal 14 and the server 16 in the information processing system 10 according to the present exemplary embodiment. Since the information processing terminal 14 and the server 16 basically have a general computer configuration, the server 16 will be described as a representative.

As shown in FIG. 2, the server 16 according to the present exemplary embodiment includes a CPU 16A, a ROM 16B, a RAM 16C, an HDD 16D, a keyboard 16E, a display 16F, and a communication interface (IF) unit 16G. The CPU 16A controls the overall operation of the server 16. The ROM 16B stores various control programs as information processing programs, various parameters, and the like in advance. The RAM 16C is used as a work area or the like when various programs are executed by the CPU 16A. The HDD 16D stores various kinds of data, application programs, and the like. The keyboard 16E is used to input various kinds of information. The display 16F is used to display various kinds of information. The communication I/F unit 16G is connected to the communication line 12 and transmits and receives various kinds of data to and from other apparatuses other than the server connected to the communication line 12. Each part of the above server 16 is electrically connected by a system bus 16H. Although the HDD 16D is applied as a storage unit in the server 16 according to the present exemplary embodiment, the present invention is not limited to thereto, and another non-volatile storage unit such as a flash memory may be applied.

With the above configuration, the server 16 according to the present exemplary embodiment executes accesses to the ROM 16B, the RAM 16C, and the HDD 16D, acquisition of various kinds of data via the keyboard 16E, and display of various kinds of information on the display 16F by the CPU 16A. The server 16 executes control of the transmission and reception of communication data via the communication I/F unit 16G by the CPU 16A.

The information processing terminal 14 further includes a microphone 14J and a camera 14I. It is possible to acquire voice by the microphone, and it is possible to acquire a captured image captured by a user by the camera 14I. The camera 14I measures presence information of the user. The presence information measured by the camera 14I measures, for example, a state of the user such as eye movement, face orientation, and face movement as information for measuring a degree of concentration. The microphone 14J and the camera 14I may be provided in the information processing terminal 14, or may be connectable to the information processing terminal 14. In the information processing terminal 14, a wearable terminal 14K can be connected to the communication I/F unit 16G. The wearable terminal measures the presence information of the user, and the measurement result can be transmitted to the information processing terminal 14. As the presence information measured by the wearable terminal 14K, for example, various biological information such as pulse and brain wave information is measured as the information for measuring the degree of concentration. In the present disclosure, the degree of concentration represents a degree of concentration of the user, and is quantified as an alternative index of whether or not only a work performed by the user is considered.

In the information processing system 10 according to the present exemplary embodiment having the above-described configuration, the server 16 provides the voice call service as the cloud service as described above. For example, as shown in FIG. 3, in the voice call service, a service in which a voice call is connected by transmitting a call from an information processing terminal 14a on a caller side working at an office to an information processing terminal 14b on a receiver side working at home is provided. Hereinafter, the information processing terminal 14 is described as the information processing terminal 14a on the caller side and the information processing terminal 14b on the receiver side. The information processing terminal 14a on the caller side corresponds to an example of a caller side terminal, and the information processing terminal 14b on the receiver side corresponds to an example of a receiver side terminal.

Figure 4:
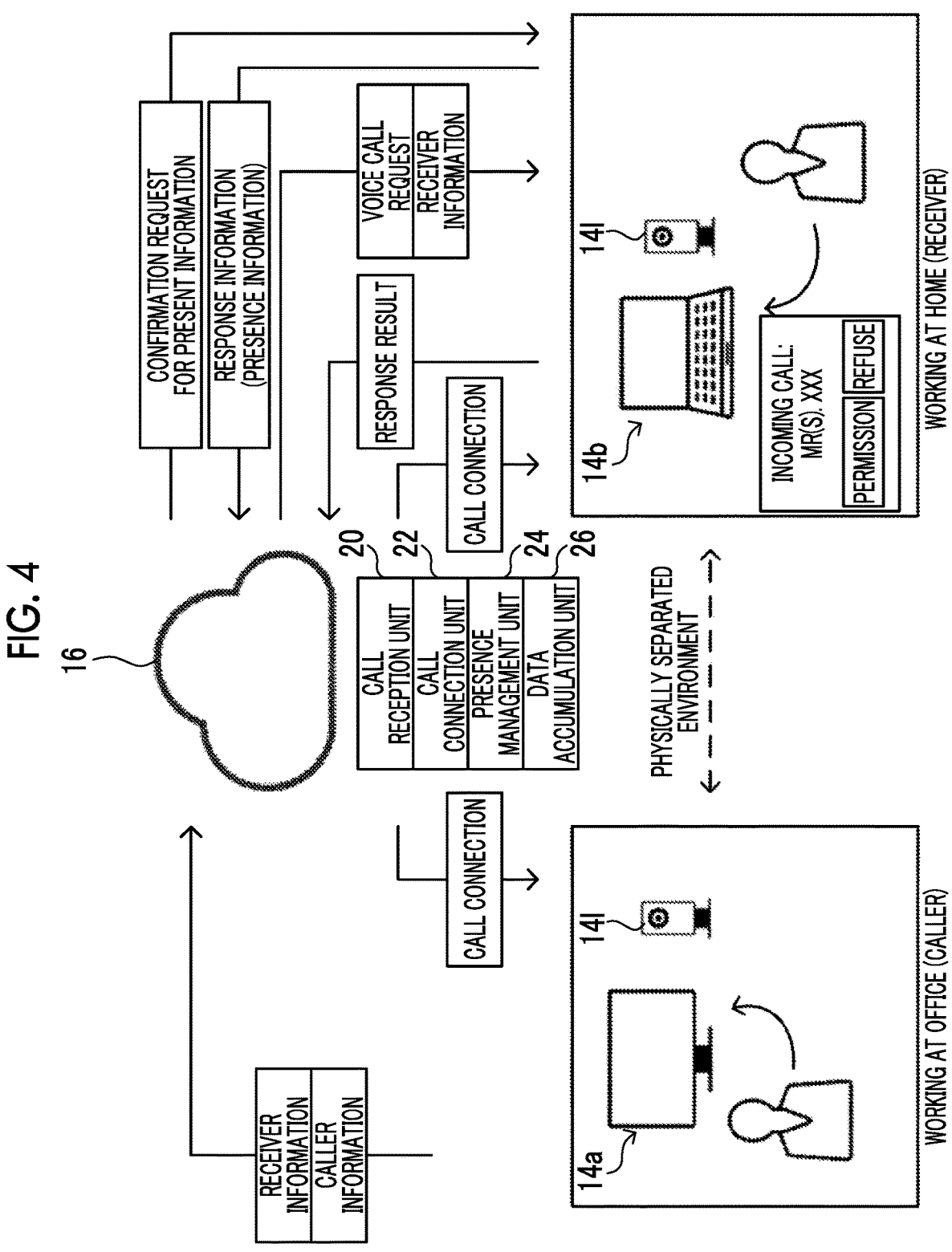
FIG. 4 is a diagram showing a functional configuration of the server of the information processing system and a flow of the voice call service according to the present exemplary embodiment.

Next, a functional configuration of the server 16 of the information processing system 10 according to the present exemplary embodiment having the above-described configuration will be described. FIG. 4 is a diagram showing the functional configuration of the server 16 of the information processing system 10 and a flow of the voice call service according to the present exemplary embodiment.

The server 16 has functions of a call reception unit 20, a call connection unit 22, a presence management unit 24, and a data accumulation unit 26 by executing an information processing program stored in the ROM 16B.

The call reception unit 20 accepts a voice call request from the information processing terminal 14a on the caller side, detects the transmission of the voice call on the information processing terminal 14a on the caller side, and then transmits a presence information confirmation request to the information processing terminal 14 on the receiver side. The data accumulation unit 26 stores, as a set, caller information representing a call number of the caller and receiver information representing a call number of a receiver. A voice call request is transmitted to the information processing terminal 14b on the receiver side starting from a notification timing of a decrease in a degree of concentration detected by the presence management unit 24.

The call connection unit 22 receives a response result of the voice call request from the receiver side, refers to the data accumulation unit, and connects the voice call between the caller and the receiver.

The presence management unit 24 detects, as the presence information, the state of the user from the wearable terminal 14K that can detect the captured image captured by the camera 14I connected to the information processing terminal 14 on the receiver side or the biological information. The presence management unit 24 detects, as a presence change, a timing of the decrease in the degree of concentration, and since a notification is transmitted from the information processing terminal 14b on the receiver side at the detected timing, the presence management unit manages the information. After the decrease in the degree of concentration is detected, the presence management unit notifies the call reception unit 20 of the detected degree in the concentration.

The data accumulation unit 26 associates the presence information on the receiver side with the set data of the caller information and the receiver information, and enable the presence information to be stored or referred to.

Here, in the information processing system 10 according to the present exemplary embodiment, a flow of voice call connection in a case where the user working at the office is the caller and the user working at home is the receiver will be described as an example.

The caller information and the receiver information are transmitted to the server 16 by operating the information processing terminal 14a, and thus, the caller requests a voice call.

In the server 16, the call reception unit 20 accepts the voice call request from the caller, and the presence management unit 24 transmits a confirmation request for the presence information to the information processing terminal 14b on the receiver side.

In the server 16, the presence management unit 24 receives response information of the presence information from the information processing terminal 14b on the receiver side, and detects the decrease in the degree of concentration of the receiver from the presence information. As the detection of the decrease in the degree of concentration of the receiver, for example, the eye movement, the face orientation, and the face movement are detected from the captured image of the camera 14I or the pulse and brain wave information detected by the wearable terminal 14K is detected. Thereafter, the degree of concentration is measured from the detection result. Here, in a case where the receiver is not present in front of the information processing terminal 14, the call connection unit 22 notifies the information processing terminal 14a on the caller side of a connection unavailable state.

Whether or not the receiver is present in front of the information processing terminal 14 may be detected from the captured image of the camera 14I, and in the case of the wearable terminal 14K, may be determined by measuring the degree of concentration with Bluetooth (registered trademark) Low Energy (BLE) radio wave intensity. In this case, whether or not the receiver is present in front of the information processing terminal may be determined by measuring the BLE radio wave intensity in front of the information processing terminal 14 before use and setting a threshold value.

In a case where the presence management unit 24 of the server 16 detects the decrease in the degree of concentration of the receiver, the call connection unit 22 notifies the receiver of the voice call request together with the caller information. In a case where the presence management unit

24 does not detect the decrease in the degree of concentration of the receiver, the presence information is remeasured at predetermined period of time intervals (for example, every few minutes). The decrease in the degree of concentration is detected by using a difference in the measurement result of presence information at two different measurement timings. For example, the decrease in the degree of concentration is detected by detecting whether or not a difference between the measurement result of the presence information in a case where the call request is accepted and the measurement result of the presence information after a predetermined period of time elapses is decreased to a predetermined degree of concentration.

The receiver operates the information processing terminal 14b to reply the response result to the voice call request to the server 16.

In a case where the response result of the receiver indicates a call available state, the call connection unit 22 accepts a call available or unavailable state of the caller, and the server 16 connects the voice call between the caller and the receiver in the case of the call available state, and notifies the receiver of the call unavailable state in the case of the call unavailable state.

On the other hand, in a case where the response result of the receiver indicates the call unavailable state, the call connection unit 22 notifies the information processing terminal 14a on the caller side of the call unavailable state.

As described above, in the information processing system 10 according to the present exemplary embodiment, in a case where the server 16 accepts the call request from the caller and the receiver is concentrated, the voice call is connected at a timing at which the degree of concentration is decreased without connecting the voice call to the receiver of the call request. That is, in the present exemplary embodiment, the server 16 suspends the call request from the caller, and the voice call is made at the timing at which the degree of concentration of the receiver is decreased. Whether or not to connect the voice call is specified by a change in information that is not a status linked to the user's manual or schedule.

Next, specific processing performed by each part of the information processing system 10 according to the present exemplary embodiment having the above-described configuration will be described.

Figure 5:
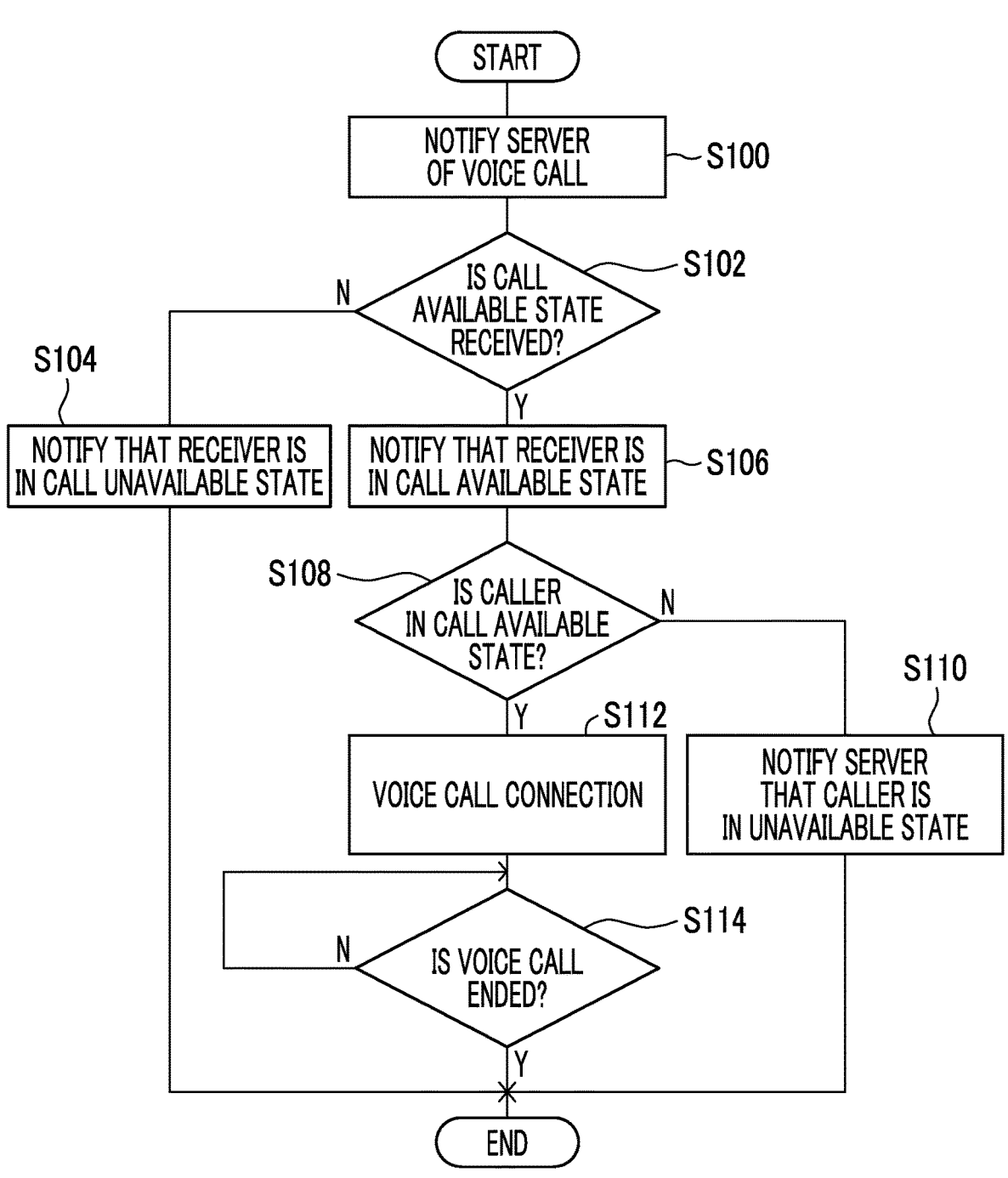
FIG. 5 is a flowchart showing an example of a flow of processing performed by an information processing terminal on a caller side in the information processing system according to the present exemplary embodiment.

First, processing performed by the information processing terminal 14a on the caller side will be described. FIG. 5 is a flowchart showing an example of a flow of the processing performed by the information processing terminal 14a on the caller side in the information processing system 10 according to the present exemplary embodiment. The processing of FIG. 5 is started, for example, in a case where the caller performs an operation of selecting the receiver information and requesting the voice call.

In step S100, the CPU 14A notifies the server 16 of the voice call, and proceeds to step S102.

In step S102, the CPU 14A determines whether or not the call available state is received from the server 16. The CPU proceeds to step S104 in case where the call unavailable state is received from the server 16 and the determination is negative, and proceeds to step S106 in a case where the determination is positive.

In step S104, the CPU 14A notifies the caller that the receiver is in the call unavailable state and ends the series of processing. For example, the notification that the receiver is in the call unavailable state may be performed by being displayed on the display 14F, may be performed by voice, or may be performed by both the display and the voice.

On the other hand, in step S106, the CPU 14A notifies the caller that the receiver is in the call available state, and proceeds to step S108. For example, the notification that the receiver is in the call available state may be performed by being displayed on the display 14F, may be performed by voice, or may be performed by both the display and the voice.

In step S108, the CPU 14A determines whether or not the caller is the call available state. The determination is performed by accepting, for example, the selection of the call available or unavailable state from the caller. The CPU proceeds to step S110 in a case where the determination is negative, and proceeds to step S112 in a case where the determination is positive.

In step S110, the CPU 14A notifies the server 16 that the caller is in the call unavailable state, and ends the series of processing.

On the other hand, in step S112, the CPU 14A connects the voice call, and proceeds to step S114. As a result, the voice call between the caller and the receiver is connected.

In step S114, the CPU 14A determines whether or not the voice call is ended. In the determination, for example, it is determined whether or not an operation of ending the voice call is performed. The CPU waits until the determination becomes positive and ends the series of processing.

Figure 6:
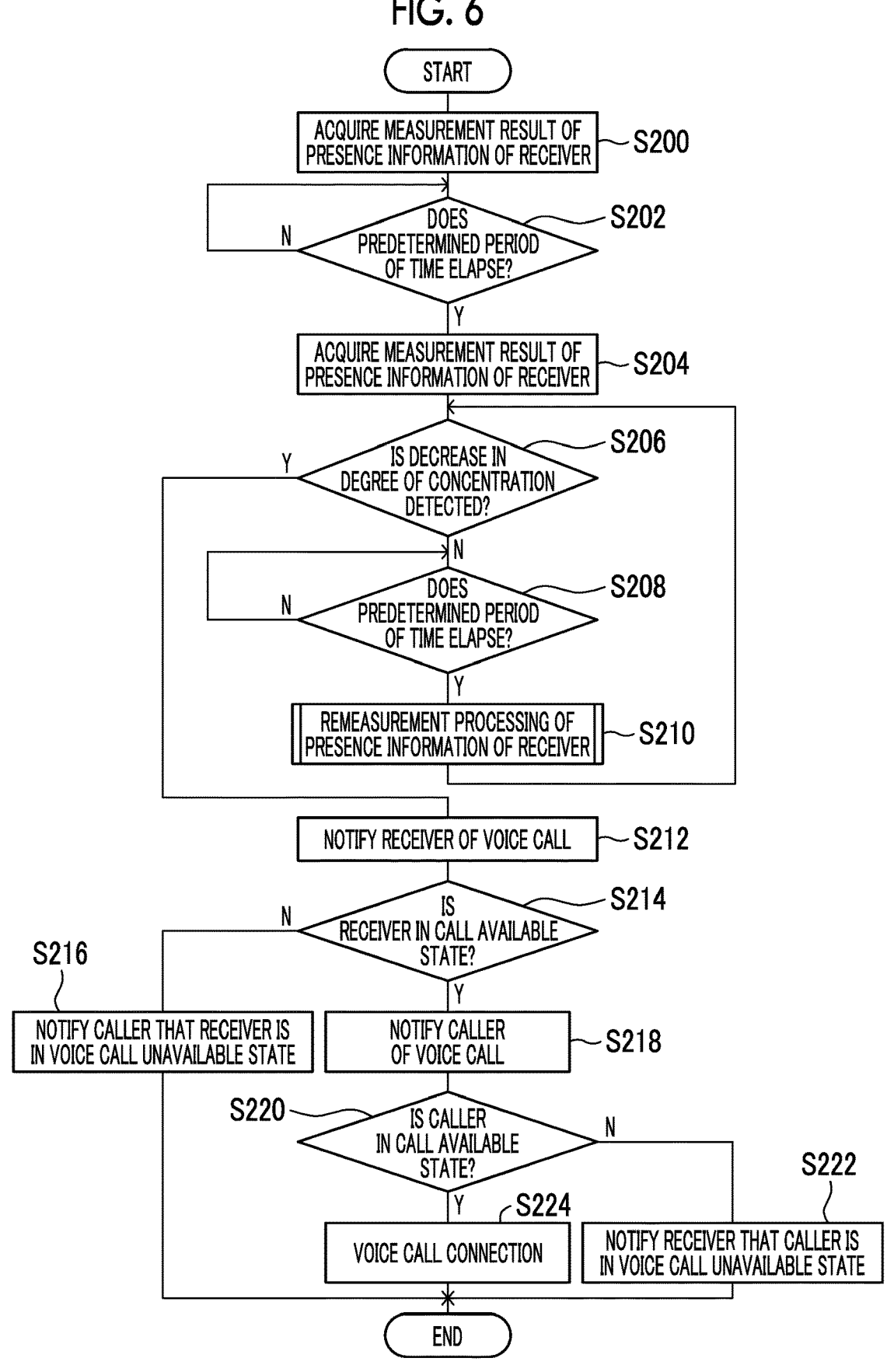
FIG. 6 is a flowchart showing an example of a flow of processing performed by the server in the information processing system according to the present exemplary embodiment.

Next, processing performed by the server 16 will be described. FIG. 6 is a flowchart showing an example of a flow of the processing performed by the server 16 in the information processing system 10 according to the present exemplary embodiment. The processing of FIG. 6 is started in a case where the call reception unit 20 receives the voice call request from the information processing terminal 14a on the caller side.

In step S200, the CPU 16A acquires the measurement result of the presence information of the receiver, and proceeds to step S202. That is, the presence management unit 24 transmits the confirmation request for the presence information to the information processing terminal 14b on the receiver side, and acquires the measurement result of the presence information from the information processing terminal 14b on the receiver side.

In step S202, the CPU 16A determines whether or not a predetermined period of time elapses. For example, the CPU determines whether or not a few minutes elapse, and proceeds to step S204 after waiting until the determination becomes positive.

In step S204, the CPU 16A acquires the measurement result of the presence information of the receiver, and proceeds to step S206. That is, as in step S200, the presence management unit 24 transmits the confirmation request for the presence information to the information processing terminal 14b on the receiver side, and acquires the measurement result of the presence information from the information processing terminal 14b on the receiver side.

In step S206, the CPU 16A determines whether or not the degree of concentration of the receiver is decreased. In the determination, it is determined whether or not the degree of concentration of the receiver is decreased due to the change in the acquired presence information. The CPU proceeds to step S208 in a case where the determination is negative, and proceeds to step S212 in a case where the determination is positive.

In step S208, the CPU 16A determines whether or not a predetermined period of time elapses. For example, the CPU determines whether or not a few minutes elapse, and proceeds to step S210 after waiting until the determination becomes positive.

In step S210, the presence information of the receiver is remeasured, and the processing returns to step S206 to repeat the above processing. In the processing of remeasuring the presence information of the receiver, the presence information of the receiver is acquired by performing the processing of steps S200 to S204 described above.

On the other hand, in step S212, the CPU 16A notifies the receiver of the voice call, and proceeds to step S214. That is, the call connection unit 22 notifies the information processing terminal 14b on the receiver side of the voice call request together with the caller information.

In step S214, the CPU 16A determines whether or not the receiver is in the call available state. In the determination, it is determined whether or not the call available state is notified from the information processing terminal 14b on the receiver side. In a case where the call unavailable state is notified from the information processing terminal 14b on the receiver side, the determination is negative and the CPU proceeds to step S216, and in a case where the determination is positive, the CPU proceeds to step S218.

In step S216, the CPU 16A notifies the caller that the receiver is in the voice call unavailable state, and ends the series of processing. That is, the call connection unit 22 notifies the information processing terminal 14a on the caller side of the call unavailable state. As a result, the determination in step S102 described above is negative.

On the other hand, in step S218, the CPU 16A notifies the caller of the voice call, and proceeds to step S220.

In step S220, the CPU 16A determines whether or not the caller is in the call available state. In the determination, the call connection unit 22 receives the call available or unavailable state from the information processing terminal 14a on the caller side, and determines whether or not the caller is in the call available state. The CPU proceeds to step S222 in a case where the determination is negative, and proceeds to step S224 in a case where the determination is positive.

In step S222, the CPU 16A notifies the receiver that the caller is in the voice call unavailable state, and ends the series of processing. That is, the call connection unit 22 notifies the information processing terminal 14b on the receiver side that the caller is in the voice call unavailable state.

On the other hand, in step S224, the CPU 16A connects the voice call and ends the series of processing. That is, the call connection unit 22 connects the voice call between the caller and the receiver. As a result, the voice call is made at the timing at which the degree of concentration of the receiver is decreased.

Figure 7:
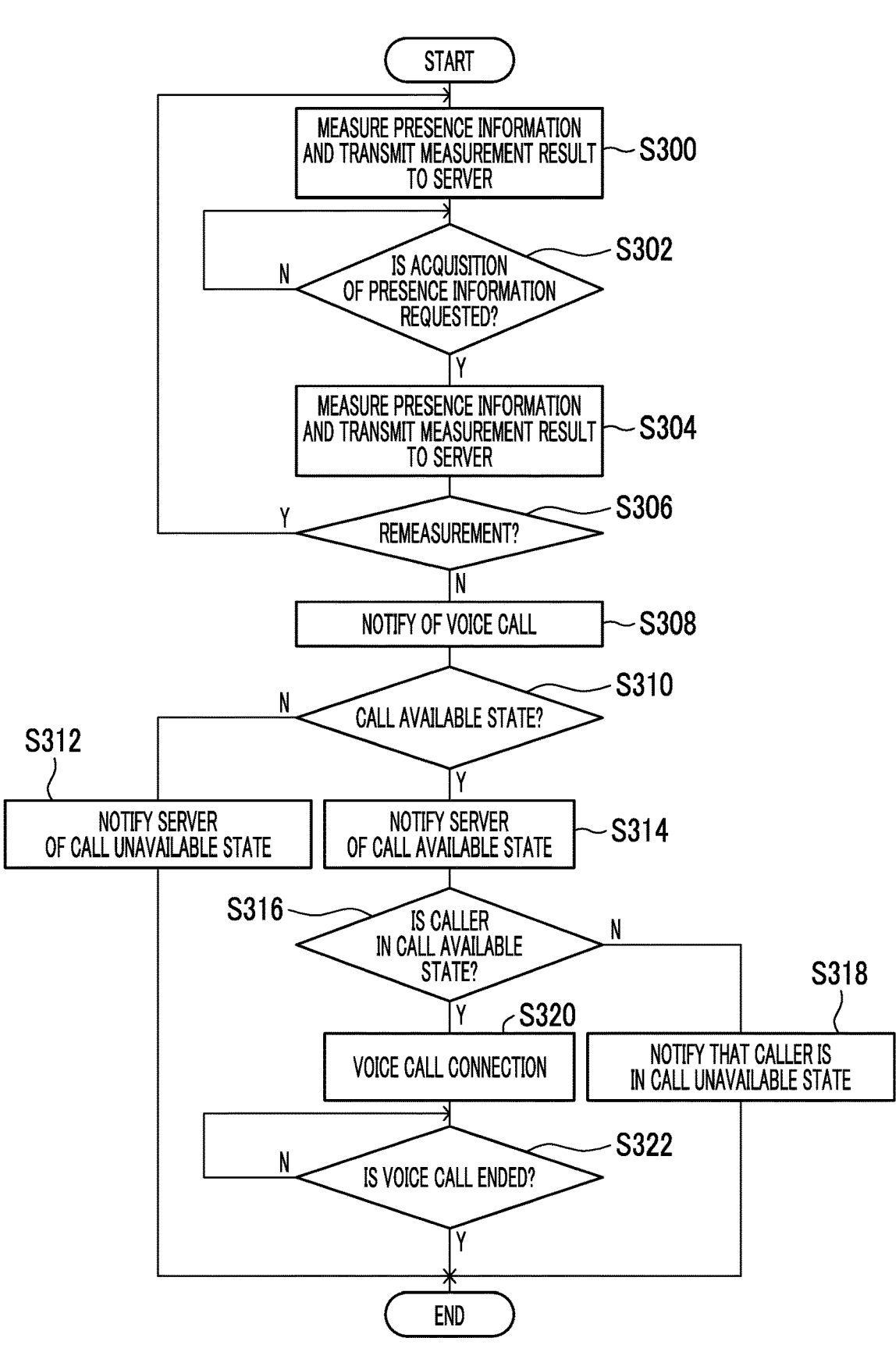
FIG. 7 is a flowchart showing an example of a flow of processing performed by an information processing terminal on a receiver side in the information processing system according to the present exemplary embodiment.

Next, processing performed by the information processing terminal 14b on the receiver side will be described. FIG. 7 is a flowchart showing an example of a flow of the processing performed by the information processing terminal 14b on the receiver side in the information processing system 10 according to the present exemplary embodiment. The processing of FIG. 7 is started, for example, in a case where the confirmation request for the presence information is received from the presence management unit 24 of the server 16.

In step S300, the CPU 14A measures the presence information, transmits the measurement result to the server 16, and proceeds to step S302. As a result, the server 16 acquires the measurement result of the presence information in step S200 described above.

In step S302, the CPU 14A determines whether or not the acquisition of presence information is requested from the server 16. The CPU waits until the determination is positive, and proceeds to step S304.

In step S304, the CPU 14A measures the presence information, transmits the measurement result to the server 16, and proceeds to step S306. As a result, the server 16 acquires the measurement result of the presence information in step S204 described above.

In step S306, the CPU 14A determines whether or not the presence information is remeasured. In the determination, it is determined whether or not the confirmation request for the presence information is performed from the server 16 by the processing of step S210 described above. In a case where the determination is positive, the CPU returns to step S300 and repeats the above processing. On the other hand, in a case where the voice call is notified from the server 16 by step S212 described above, the determination is negative and the CPU proceeds to step S308.

In step S308, the CPU 14A notifies the receiver of the voice call and proceeds to step S310. For example, the caller information may be notified by being displayed on the display 14F, may be notified by voice, or may be notified by both the display and the voice.

In step S310, the CPU 14A determines whether or not the receiver is in the call available state. In the determination, the server accepts the call available or unavailable state of the receiver, and in the case of the call unavailable state, the determination is negative and the CPU proceeds to step S312, and in a case where the call available state, the determination is positive and the CPU proceeds to step S314.

In step S312, the CPU 14A notifies the server 16 of the call unavailable state and ends the series of processing. As a result, the determination in step S214 described above is negative.

On the other hand, in step S314, the CPU 14A notifies the server 16 of the call available state and proceeds to step S316. As a result, the determination in step S214 described above is positive.

In step S316, the CPU 14A determines whether or not the caller is in the call available state. In a case where the call unavailable state is notified by the server 16 by step S222 described above, the determination is negative and the CPU proceeds to step S318. On the other hand, in a case where the voice call is connected by the server 16 in step S224, the determination is positive, and the CPU proceeds to step S320.

In step S318, the CPU 14A notifies the receiver that the caller is in the call unavailable state and ends the series of processing. For example, the notification that the caller is in the call unavailable state may be performed by being displayed on the display 14F, may be performed by voice, or may be performed by both the display and the voice.

On the other hand, in step S320, the CPU 14A connects the voice call and proceeds to step S322. As a result, the voice call between the caller and the receiver is connected.

In step S322, the CPU 14A determines whether or not voice call is ended. In the determination, for example, it is determined whether or not an operation of ending the voice call is performed. The CPU waits until the determination becomes positive and ends the series of processing.

Next, a modification example of the processing performed by the information processing system 10 according to the present exemplary embodiment will be described.

In the above exemplary embodiment, although the receiver waits for the timing at which the degree of concentration of the receiver is decreased after the caller requests the voice call, since there is no restriction on a waiting period of time, the caller continues to wait until the degree of concentration of the receiver is decreased.

Figure 8:
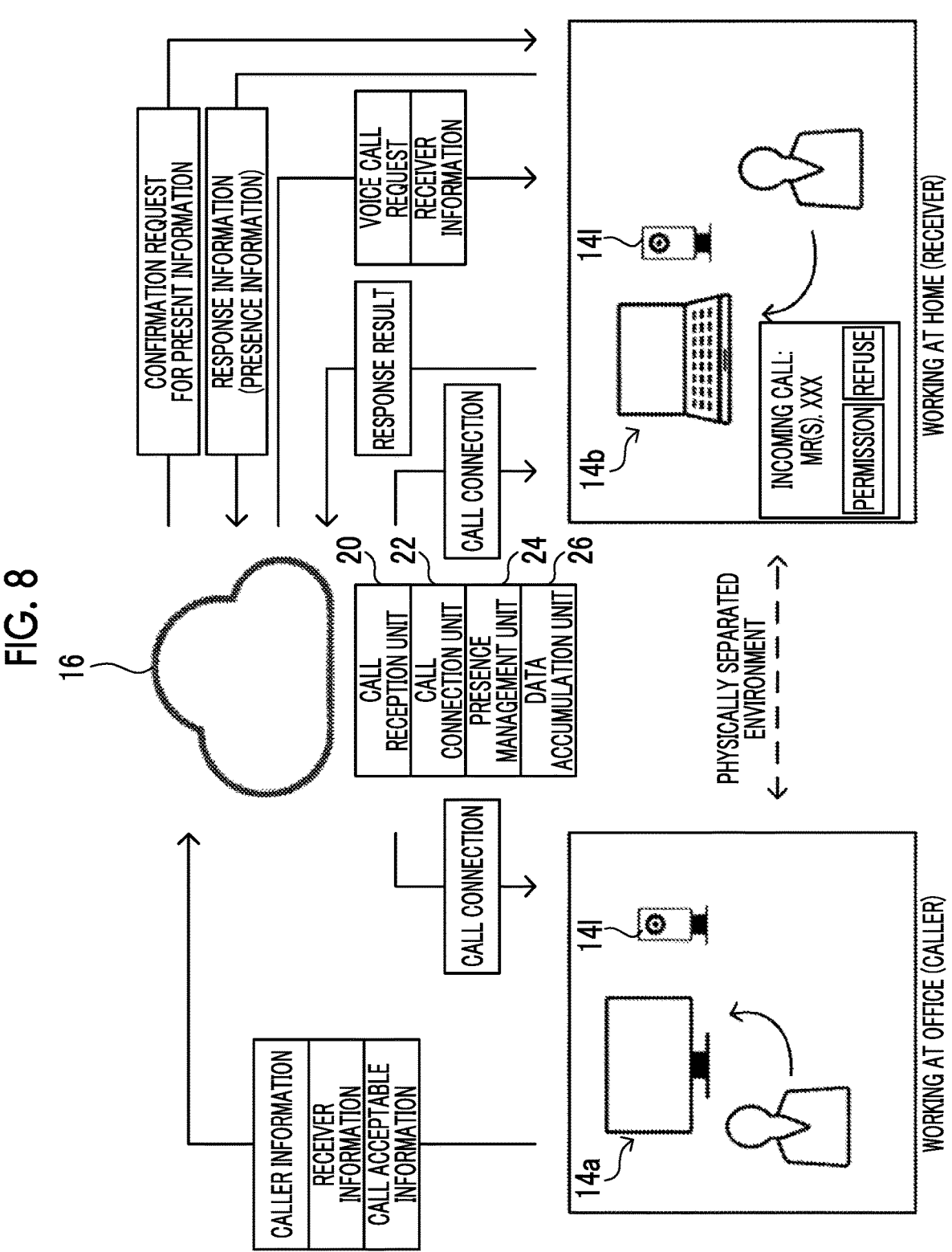
FIG. 8 is a diagram illustrating a functional configuration of the server of the information processing system according to the present exemplary embodiment and a modification example of processing performed by the voice call service.

Thus, in the modification example, it is possible to set call acceptable information such as a time and a period of time in which the caller side can accept the call. FIG. 8 is a diagram illustrating a modification example of the functional configuration of the server of the information processing system 10 according to the present exemplary embodiment and the processing performed by the voice call service.

That is, the caller side sets the call acceptable information (for example, a time such as "from 9:00 to 9:30" or a period of time such as "within 15 minutes from now") and makes the voice call with the receiver by the voice call service.

Although in the decrease in the degree of concentration on the receiver side is detected within a set period of time, the receiver side is notified of the voice call request and voice call connection processing is started as in the above exemplary embodiment, the call acceptable information is also notified to the receiver side at this time.

In the decrease in the degree of concentration cannot be detected within the set period of time, the caller side is notified of the voice call unavailable state. On the contrary, in a case where the voice call is received out of a period of time of the call acceptable information, the receiver side is notified of the voice call unavailable state.

Figure 9:
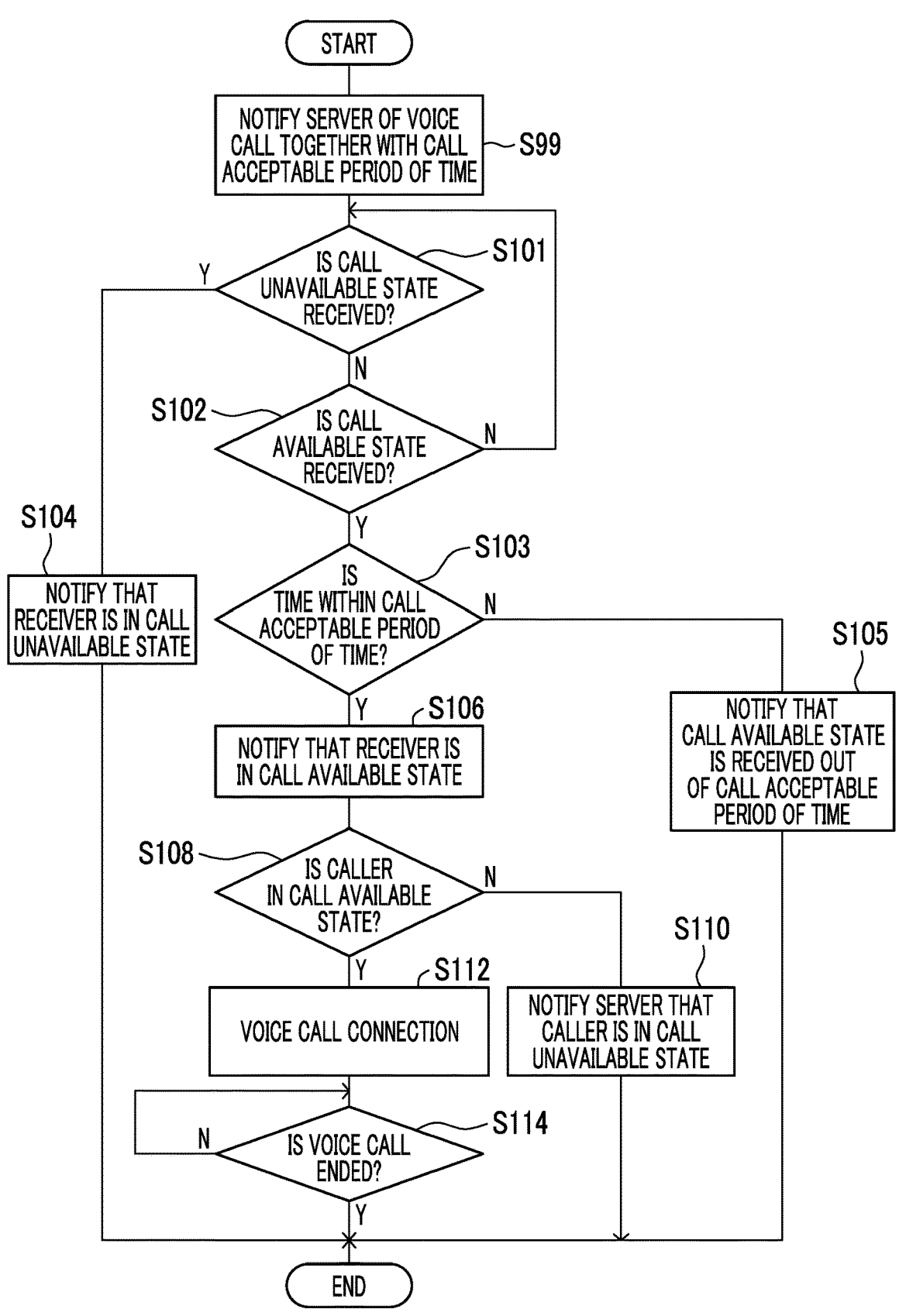
FIG. 9 is a flowchart showing a modification example of the flow of the processing performed by the information processing terminal on the caller side in the information processing system according to the present exemplary embodiment.

Next, in a modification example, processing performed by the information processing terminal 14a on the caller side will be described. FIG. 9 is a flowchart showing a modification example of the flow of the processing performed by the information processing terminal 14a on the caller side in the information processing system 10 according to the present exemplary embodiment. The processing of FIG. 9 is started, for example, in a case where the caller performs an operation of selecting the receiver information and requesting the voice call. The processing identical to FIG. 5 will be described with the identical reference numeral.

In step S99, the CPU 14A notifies the server 16 of the voice call together with a call acceptable period of time, and proceeds to step S101.

In step S101, the CPU 14A determines whether or not the call unavailable state is received from the server 16. In the determination, it is determined whether or not the call unavailable state is notified from the server 16 after the call acceptable period of time elapses or whether or not the server 16 notifies that the receiver is in the call unavailable state. The CPU proceeds to step S102 in a case where the determination is negative, and proceeds to step S104 in a case where the determination is positive.

In step S102, the CPU 14A determines whether or not the call available state is received from the server 16. The CPU returns to step S101 to repeat the above processing in a case where the call unavailable state is received from the server 16 and the determination is negative, and proceeds to step S103 in a case where the determination is positive.

In step S104, the CPU 14A notifies the caller that the receiver is in the call unavailable state and ends the series of processing. For example, the notification that the receiver is in the call unavailable state may be performed by being displayed on the display 14F, may be performed by voice, or may be performed by both the display and the voice.

On the other hand, in step S103, the CPU 14A determines whether or not the time is within the call acceptable period of time of the caller. The CPU proceeds to step S105 in a case where the determination is negative, and proceeds to step S106 in a case where the determination is positive.

In step S105, the CPU 14A notifies that the call available state is received from the receiver out of the call acceptable period of time, and ends the series of processing. For example, the notification that the call available state is received from the receiver out of the call acceptable period of time may be performed by being displayed on the display 14F, or may be performed by voice, or may be performed by both the display and the voice.

On the other hand, in step S106, the CPU 14A notifies the caller that the receiver is in the call available state, and proceeds to step S108. For example, the notification that the receiver is in the call available state may be performed by being displayed on the display 14F, may be performed by voice, or may be performed by both the display and the voice.

In step S108, the CPU 14A determines whether or not the caller is the call available state. The determination is performed by accepting, for example, the selection of the call available or unavailable state from the caller. The CPU proceeds to step S110 in a case where the determination is negative, and proceeds to step S112 in a case where the determination is positive.

In step S110, the CPU 14A notifies the server 16 that caller is in the call unavailable state, and ends the series of processing.

On the other hand, in step S112, the CPU 14A connects the voice call, and proceeds to step S114. As a result, the voice call between the caller and the receiver is connected.

In step S114, the CPU 14A determines whether or not the voice call is ended. In the determination, for example, it is determined whether or not an operation of ending the voice call is performed. The CPU waits until the determination becomes positive and ends the series of processing.

Figure 10A:
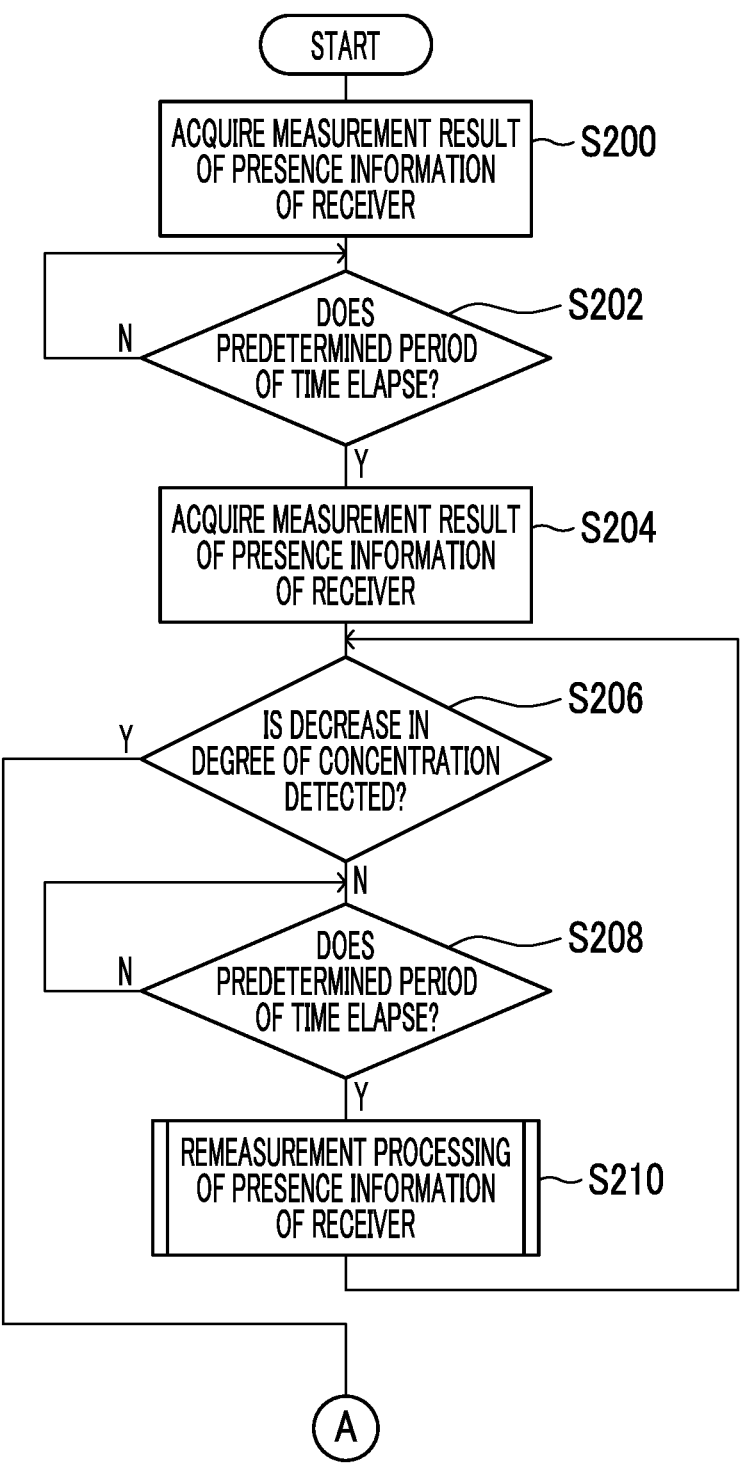
FIGS. 10A and 10B are flowcharts showing a modification example of the flow of the processing performed by a server in the information processing system according to the present exemplary embodiment.
Figure 10B:
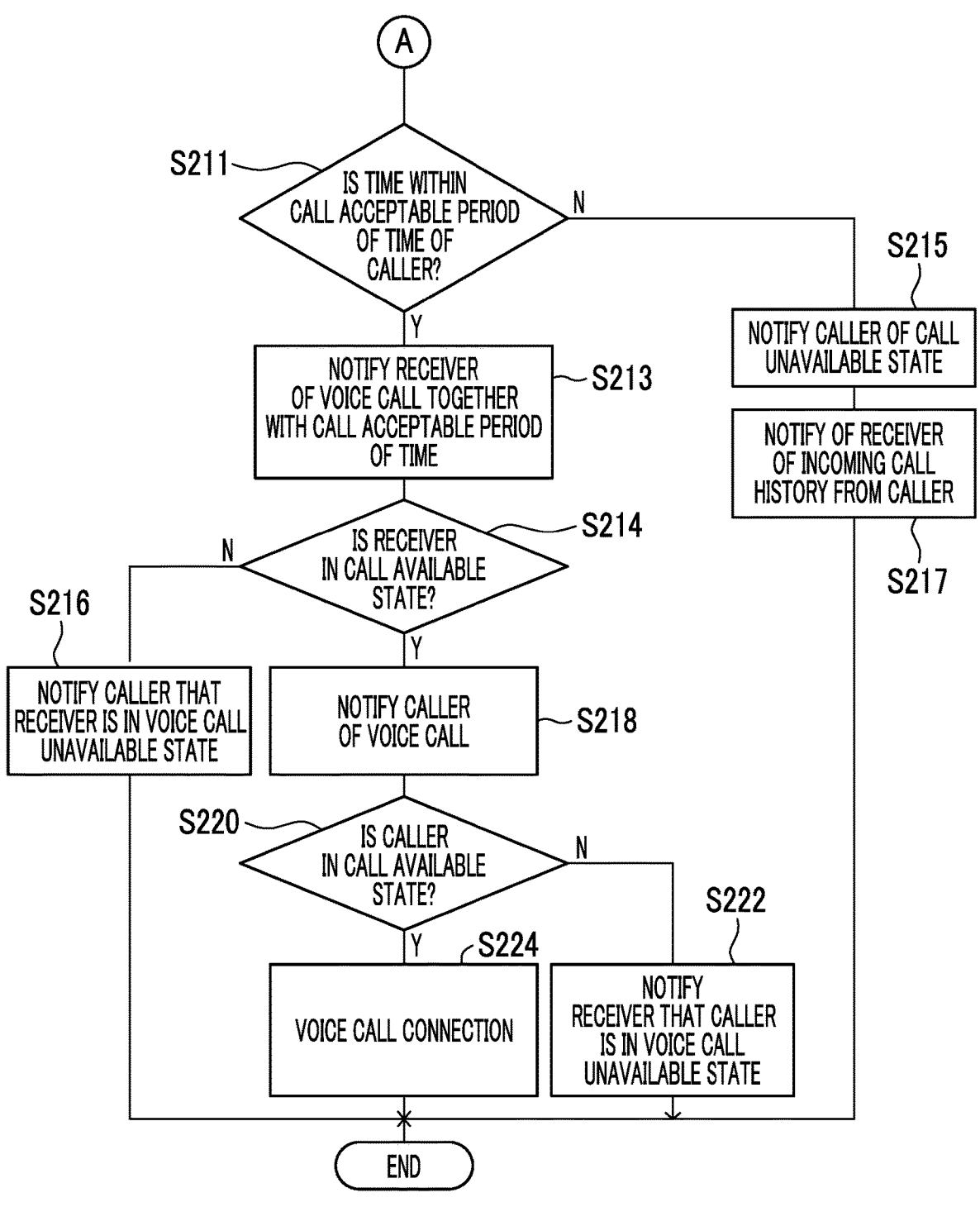

Next, in a modification example, processing performed by the server 16 will be described. FIGS. 10A and 10B are flowcharts showing a modification example of the flow of the processing performed by the server 16 in the information processing system 10 according to the present exemplary embodiment. The processing of FIGS. 10A and 10B is started in a case where the call reception unit 20 receives the voice call request from the information processing terminal 14a on the caller side.

In step S200, the CPU 16A acquires the measurement result of the presence information of the receiver, and proceeds to step S202. That is, the presence management unit 24 transmits the confirmation request for the presence information to the information processing terminal 14b on the receiver side, and acquires the measurement result of the presence information from the information processing terminal 14b on the receiver side.

In step S202, the CPU 16A determines whether or not a predetermined period of time elapses. For example, the CPU determines whether or not a few minutes elapse, and proceeds to step S204 after waiting until the determination becomes positive.

In step S204, the CPU 16A acquires the measurement result of the presence information of the receiver, and proceeds to step S206. That is, as in step S200, the presence management unit 24 transmits the confirmation request for the presence information to the information processing terminal 14b on the receiver side, and acquires the measurement result of the presence information from the information processing terminal 14b on the receiver side.

In step S206, the CPU 16A determines whether or not the degree of concentration of the receiver is decreased. In the determination, it is determined whether or not the degree of concentration of the receiver is decreased due to the change in the acquired presence information. The CPU proceeds to step S208 in a case where the determination is negative, and proceeds to step S211 in a case where the determination is positive.

In step S208, the CPU 16A determines whether or not a predetermined period of time elapses. For example, the CPU determines whether or not a few minutes elapse, and proceeds to step S210 after waiting until the determination becomes positive.

In step S210, the presence information of the receiver is remeasured, and the processing returns to step S206 to repeat the above processing. In the processing of remeasuring the presence information of the receiver, the presence information of the receiver is acquired by performing the processing of steps S200 to S204 described above.

On the other hand, in step S211, the CPU 16A determines whether or not the time is within the call acceptable period of time of the caller. The CPU proceeds to step S215 in a case where the determination is negative, and proceeds to step S213 in a case where the determination is positive.

In step S215, the CPU 16A notifies the caller of the call unavailable state, and proceeds to step S217. That is, the call connection unit 22 notifies the information processing terminal 14a on the caller side of the call unavailable state within the call acceptable period of time. As a result, in the information processing terminal 14a on the caller side, the determination in step S101 described above is positive.

In step S217, the CPU 16A notifies the receiver of an incoming call history from the caller and ends the series of processing. That is, the voice call is not notified, and the receiver is notified of only the incoming call history. Step S217 may be omitted.

On the other hand, in step S213, the CPU 16A notifies the receiver of the voice call together with the call acceptable period of time, and proceeds to step S214. That is, the call connection unit 22 notifies the information processing terminal 14b on the receiver side of the voice call request together with the caller information, and also notifies the call acceptable period of time of the caller.

In step S214, the CPU 16A determines whether or not the receiver is in the call available state. In the determination, it is determined whether or not the call available state is notified from the information processing terminal 14b on the receiver side. In a case where the call unavailable state is notified from the information processing terminal 14b on the receiver side, the determination is negative and the CPU proceeds to step S216, and in a case where the determination is positive, the CPU proceeds to step S218.

In step S216, the CPU 16A notifies the caller that the receiver is in the voice call unavailable state, and ends the series of processing. That is, the call connection unit 22 notifies the information processing terminal 14a on the caller side of the call unavailable state. As a result, the determination in step S102 described above is negative.

On the other hand, in step S218, the CPU 16A notifies the caller of the voice call, and proceeds to step S220.

In step S220, the CPU 16A determines whether or not the caller is in the call available state. In the determination, the call connection unit 22 receives the call available or unavailable state from the information processing terminal 14a on the caller side, and determines whether or not the caller is in the call available state. The CPU proceeds to step S222 in a case where the determination is negative, and proceeds to step S224 in a case where the determination is positive.

In step S222, the CPU 16A notifies the receiver that the caller is in the voice call unavailable state, and ends the series of processing. That is, the call connection unit 22 notifies the information processing terminal 14b on the receiver side that the caller is in the voice call unavailable state.

On the other hand, in step S224, the CPU 16A connects the voice call and ends the series of processing. That is, the call connection unit 22 connects the voice call between the caller and the receiver. As a result, the voice call is made at the timing at which the degree of concentration of the receiver is decreased.

Figure 11:
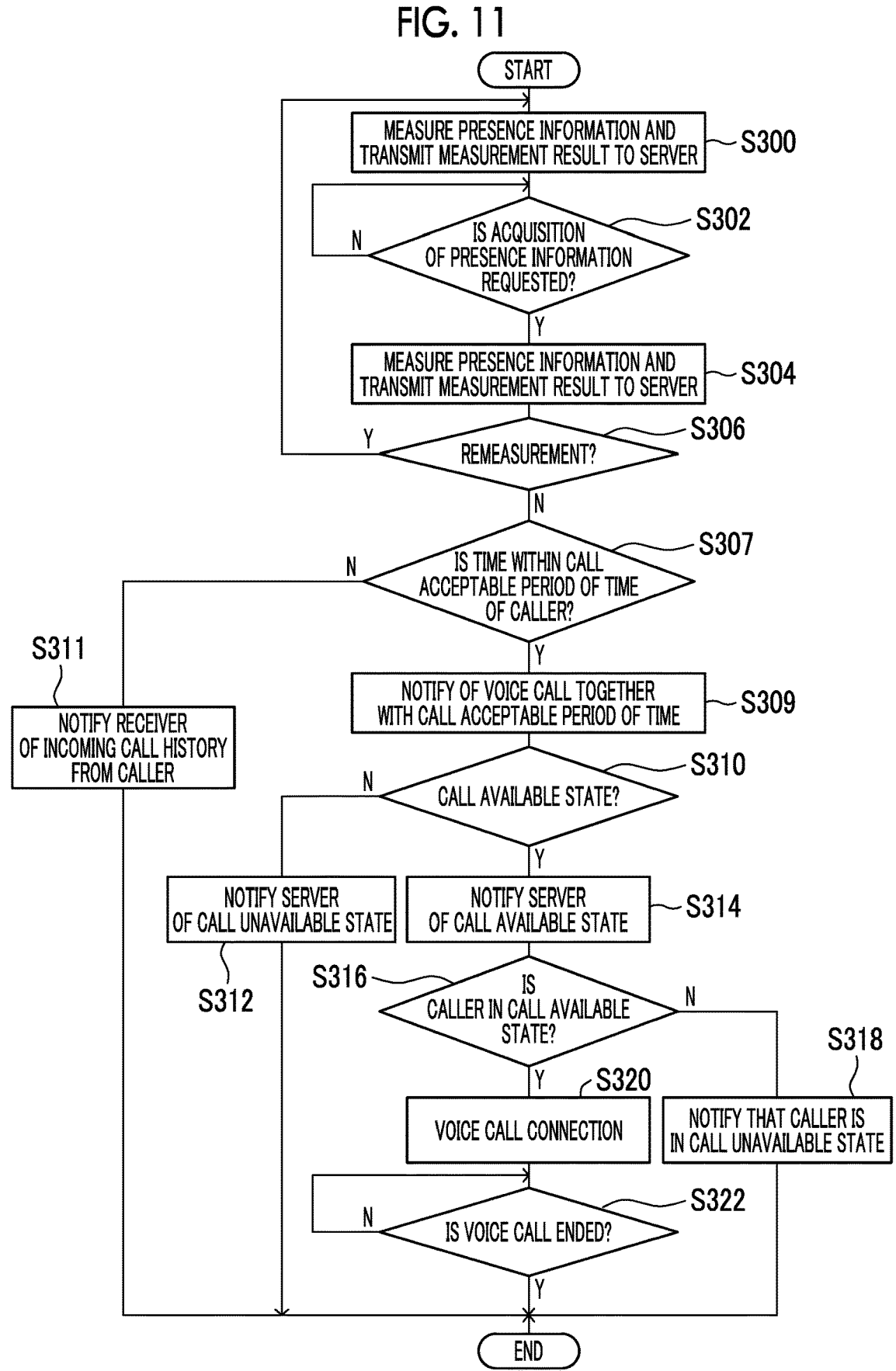
FIG. 11 is a flowchart showing a modification example of the flow of the processing performed by the information processing terminal on the receiver side in the information processing system according to the present exemplary embodiment.

Next, in a modification example, processing performed by the information processing terminal 14*b* on the receiver side will be described. FIG. 11 is a flowchart showing a modification example of the flow of the processing performed by the information processing terminal 14*b* on the receiver side in the information processing system 10 according to the present exemplary embodiment. The processing of FIG. 11 is started, for example, in a case where the confirmation request for the presence information is received from the presence management unit 24 of the server 16.

In step S300, the CPU 14A measures the presence information, transmits the measurement result to the server 16, and proceeds to step S302. As a result, the server 16 acquires the measurement result of the presence information in step S200 described above.

In step S302, the CPU 14A determines whether or not the acquisition of presence information is requested from the server 16. The CPU waits until the determination is positive, and proceeds to step S304.

In step S304, the CPU 14A measures the presence information, transmits the measurement result to the server 16, and proceeds to step S306. As a result, the server 16 acquires the measurement result of the presence information in step S204 described above.

In step S306, the CPU 14A determines whether or not presence information is remeasured. In the determination, it is determined whether or not the confirmation request for the presence information is performed from the server 16 by the processing of step S210 described above. In a case where the determination is positive, the CPU returns to step S300 and repeats the above processing. On the other hand, in a case where the server 16 notifies the voice call by step S212 described above, the determination is negative and the CPU proceeds to step S307.

In step S307, the CPU 14A determines whether or not time is within the call acceptable period of time of the caller. The CPU proceeds to step S311 in a case where the determination is negative, and proceeds to step S309 in a case where the determination is positive.

In step S311, the CPU 14A notifies the receiver of the incoming call history from the caller and ends the series of processing. The caller information may be notified by being displayed as the incoming call history on the display 14F, may be notified by voice, or may be notified by both the display and the voice. The incoming call history may be displayed in a case where a display instruction of the receiver is accepted, or may be output by voice. In a case where step S217 described above is omitted, step S311 is also omitted.

On the other hand, in step S309, the CPU 14A notifies the receiver of the voice call together with the call acceptable period of time of the caller, and proceeds to step S310. For example, the caller information and the call acceptable period of time may be notified by being displayed on the display 14F, may be notified by voice, or may be notified by both the display and the voice.

In step S310, the CPU 14A determines whether or not the receiver is in the call available state. In the determination, the server accepts the call available or unavailable state of the receiver, and in the case of the call unavailable state, the determination is negative and the CPU proceeds to step S312, and in a case where the call available state, the determination is positive and the CPU proceeds to step S314.

In step S312, the CPU 14A notifies the server 16 of the call unavailable state and ends the series of processing. As a result, the determination in step S214 described above is negative.

On the other hand, in step S314, the CPU 14A notifies the server 16 of the call available state and proceeds to step S316. As a result, the determination in step S214 described above is positive.

In step S316, the CPU 14A determines whether or not the caller is in the call available state. In a case where the call unavailable state is notified by the server 16 by step S222 described above, the determination is negative and the CPU proceeds to step S318. On the other hand, in a case where the voice call is connected by the server 16 in step S224, the determination is positive, and the CPU proceeds to step S320.

In step S318, the CPU 14A notifies the receiver that the caller is in the call unavailable state and ends the series of processing. For example, the notification that the caller is in the call unavailable state may be performed by being displayed on the display 14F, may be performed by voice, or may be performed by both the display and the voice.

On the other hand, in step S320, the CPU 14A connects the voice call and proceeds to step S322. As a result, the voice call between the caller and the receiver is connected.

In step S322, the CPU 14A determines whether or not the voice call is ended. In the determination, for example, it is determined whether or not an operation of ending the voice call is performed. The CPU waits until the determination becomes positive and ends the series of processing.

In a modification example, in a case where the decrease in the degree of concentration cannot be detected within the call acceptable period of time of the caller, the receiver side may be notified that the caller side is notified before the caller side is notified of the voice call unavailable state. The decrease in the degree of concentration can be confirmed in the incoming call history, but whether to display or not in the setting of the receiver side may be able to be set.

In the above exemplary embodiment and modification examples, although the camera 14I or the wearable terminal 14K is used for measuring the degree of concentration and detecting the decrease in the degree of concentration, the present invention is not limited thereto. For example, it may be determined that the degree of concentration is decreased by detecting a switching timing at which an operation target application used by the receiver is switched to another application. Alternatively, it may be determined that the degree of concentration is decreased at a timing at which an operation is detected from a state where the keyboard 14E and a mouse are not operated even after a predetermined period of time elapses. Alternatively, it may be determined that the degree of concentration is decreased in a case where the state in which the keyboard 14E and the mouse are not operated is continued for a predetermined period of time. The degree of concentration may be measured by using at least one of a captured image of the receiver, a detection result of biological information of the receiver, or an operation state of the receiver side terminal. The determination may be performed by using only information of a linked schedule management application and an application indicating a presence, or a combination thereof. For example, in a case where only the information of the schedule management application or the application indicating the presence is used, it may be determined that the degree of concentration is high during a period in which a schedule is already input and a period in which a presence that cannot be responded is set. It may be determined that the degree of concentration is high only for a scheduled period accepted by the user and a period of a presence explicitly designated by the user. In the case of the combination, notification may be performed in a case where it is determined that a degree of concentration in camera information, biological information, or the like is decreased during a period of a state where the schedule application has no schedule or the presence can respond.

In the above exemplary embodiment and modification examples, the caller side may be able to confirm a call waiting situation of the receiver before making a call. For example, in a case where the receiver is waiting for a call, the caller side will be notified before making a call. Specifically, at a stage where the receiver of the voice call is determined, "currently, there are three people waiting for the call" or the like may be displayed.

In the above exemplary embodiment and modification examples, although the degree of concentration of the receiver is measured in a case where the server 16 is requested to make the voice call, the measurement timing is not limited thereto. For example, the caller side may be able to measure the degree of concentration of the other party before making a call. Specifically, at a timing at which the chat with the user is opened or a timing at which a confirmation button is pressed separately from a call button of the voice call, a degree of concentration of the other party is confirmed before making a call, and it may be possible to confirm whether it may take a period of time before the connection after the voice call.

In the above exemplary embodiment and modification examples, although the voice call is not established until the degree of concentration is decreased regardless of the user, the present invention is not limited thereto. For example, a user (for example, a boss or the like) who can make a call even during a work may be set in advance.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processing performed in each part of the information processing system 10 according to the above exemplary embodiment may be processing performed by software, processing performed by hardware, or processing in which both the software and the hardware are combined. The processing performed in each part of the information processing system 10 may be stored in a storage medium as a program and distributed.

The present invention is not limited to the above description, and it is needless to say that the present invention can be variously modified and implemented within a range not deviating from the gist thereof.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to perform a process including:
acquiring a detection result of a state of a receiver who receives a call request at a receiver side terminal or a measurement result of a degree of concentration of the receiver measured from the detection result in a case where the call request is accepted from a caller side terminal;
notifying the receiver side terminal of the call request in a case where the degree of concentration measured from the acquired detection result or the degree of concentration that is the measurement result is decreased to a predetermined degree of concentration; and
not notifying the receiver side terminal of the call request in a case where the degree of concentration of the receiver is not decreased within a call acceptable period of time.

2. The information processing apparatus according to claim 1, wherein the processor is configured to:
detect the decrease in the degree of concentration of the receiver by using a difference in the detection result at two different detection timings.

3. The information processing apparatus according to claim 1, wherein the processor is configured to:
accept the call request including the call acceptable period of time from the caller side terminal, and notify the receiver side terminal of the call request in a case where the degree of concentration of the receiver is decreased within the call acceptable period of time.

4. The information processing apparatus according to claim 2, wherein the processor is configured to:
accept the call request including the call acceptable period of time from the caller side terminal, and notify the receiver side terminal of the call request in a case where the degree of concentration of the receiver is decreased within the call acceptable period of time.

5. The information processing apparatus according to claim 1, wherein the processor is configured to:
notify the caller side terminal of a call unavailable state in a case where the degree of concentration of the receiver is not decreased within the call acceptable period of time.

6. The information processing apparatus according to claim 5, wherein the processor is configured to:
notify, in a case where the caller side terminal is notified of the call unavailable state, the receiver side terminal of the call unavailable state.

7. The information processing apparatus according to claim 1, wherein the processor is configured to:
measure the degree of concentration of the receiver by using at least one of a captured image obtained by capturing the receiver, a detection result of biological information of the receiver, or an operation state of the receiver side terminal.

8. The information processing apparatus according to claim 7, wherein the processor is configured to:

detect, as the decrease in the degree of concentration, a case where switching of an operation target application is detected as the operation state.

9. The information processing apparatus according to claim 7, wherein the processor is configured to:

detect, as the decrease in the degree of concentration, a case where an operation is detected from a state where the receiver side terminal is not operated for a predetermined period of time as the operation state.

10. The information processing apparatus according to claim 7, wherein the processor is configured to:

detect, as the decrease in the degree of concentration, a case where a state where the receiver side terminal is not operated is continued for a predetermined period of time as the operation state.

11. The information processing apparatus according to claim 1, wherein the processor is configured to:

notify the caller side terminal that call waiting occurs in a case where the receiver waits a call.

12. The information processing apparatus according to claim 1, wherein the processor is configured to:

detect the decrease in the degree of concentration of the receiver in a case where a predetermined operation is accepted before the call request is accepted from the caller side terminal.

13. The information processing apparatus according to claim 1, wherein the processor is configured to:

notify the receiver side terminal of the call request regardless of the degree of concentration in a case where the call request for a preset receiver is accepted.

14. An information processing system comprising:

the information processing apparatus according to claim 1; and a plurality of information processing terminals that function as the caller side terminal and the receiver side terminal.

15. A non-transitory computer readable medium storing an information processing program causing a computer to execute a process comprising:

acquiring a detection result of a state of a receiver who receives a call request at a receiver side terminal or a measurement result of a degree of concentration of the receiver measured from the detection result in a case where the call request is accepted from a caller side terminal;

notifying the receiver side terminal of the call request in a case where the degree of concentration measured from the acquired detection result or the degree of concentration that is the measurement result is decreased to a predetermined degree of concentration; and not notifying the receiver side terminal of the call request in a case where the degree of concentration of the receiver is not decreased within a call acceptable period of time.

16. An information processing method comprising:

acquiring a detection result of a state of a receiver who receives a call request at a receiver side terminal or a measurement result of a degree of concentration of the receiver measured from the detection result in a case where the call request is accepted from a caller side terminal;

notifying the receiver side terminal of the call request in a case where the degree of concentration measured from the acquired detection result or the degree of concentration that is the measurement result is decreased to a predetermined degree of concentration; and not notifying the receiver side terminal of the call request in a case where the degree of concentration of the receiver is not decreased within a call acceptable period of time.

\* \* \* \* \*